US008495032B2

(12) United States Patent
Anglin et al.

(10) Patent No.: US 8,495,032 B2
(45) Date of Patent: Jul. 23, 2013

(54) POLICY BASED SHARING OF REDUNDANT DATA ACROSS STORAGE POOLS IN A DEDUPLICATING SYSTEM

(75) Inventors: Matthew J. Anglin, Tucson, AZ (US); David M. Cannon, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 12/243,743

(22) Filed: Oct. 1, 2008

(65) Prior Publication Data

US 2010/0082558 A1 Apr. 1, 2010

(51) Int. Cl.
*G06F 17/00* (2006.01)

(52) U.S. Cl.
USPC ............ 707/692; 707/673; 707/694; 707/696

(58) Field of Classification Search
None
See application file for complete search history.

(56) References Cited

U.S. PATENT DOCUMENTS

| | | | |
|---|---|---|---|
| 5,479,654 A | 12/1995 | Squibb | |
| 5,990,810 A | 11/1999 | Williams | |
| 6,513,051 B1 | 1/2003 | Bolosky et al. | |
| 6,523,019 B1 | 2/2003 | Borthwick et al. | |
| 6,889,297 B2 | 5/2005 | Krapp et al. | |
| 6,934,714 B2 | 8/2005 | Meinig | |
| 7,043,727 B2 | 5/2006 | Bennett et al. | |
| 7,065,619 B1 | 6/2006 | Zhu et al. | |
| 7,092,956 B2 | 8/2006 | Ruedinger | |
| 7,116,249 B2 | 10/2006 | McCanne et al. | |
| 7,143,091 B2 | 11/2006 | Charnock et al. | |
| 7,200,604 B2 | 4/2007 | Forman et al. | |
| 7,254,596 B2 | 8/2007 | De Spiegeleer | |
| 7,356,730 B2 | 4/2008 | Ulrich et al. | |
| 7,584,338 B1 | 9/2009 | Bricker et al. | |
| 7,814,149 B1* | 10/2010 | Stringham | 709/203 |
| 7,822,939 B1* | 10/2010 | Veprinsky et al. | 711/170 |
| 2002/0107877 A1 | 8/2002 | Whiting et al. | |
| 2002/0116402 A1 | 8/2002 | Luke | |
| 2002/0178162 A1* | 11/2002 | Ulrich et al. | 707/10 |
| 2005/0268068 A1 | 12/2005 | Ignatius et al. | |

(Continued)

FOREIGN PATENT DOCUMENTS

WO WO 2007/042954 A2 4/2007

OTHER PUBLICATIONS

Jack G. Conrad, "Online Duplicate Document Detection: Signature Reliability in a Dynamic Retrieval Environment," 2005, pp. 443-452.
Lise Getoor, "Link Mining: A Survey," 2005, pp. 3-12.

(Continued)

*Primary Examiner* — Mohammad S Rostami
(74) *Attorney, Agent, or Firm* — Kunzler Law Group, PC (57) ABSTRACT

One aspect of the present invention includes enabling data chunks to be shared among different storage pools within a storage management system, according the use of deduplication and storage information kept at the system level, and applied with policy-based rules that define the scope of deduplication. In one embodiment, the parameters of performing deduplication are defined within the policy, particularly which of the plurality of storage pools allow deduplication to which other pools. Accordingly, a data object may be linked to deduplicated data chunks existent within other storage pools, and the transfer of a data object may occur by simply creating references to existing data chunks in other pools provided the policy allows the pool to reference chunks in these other pools. Additionally, a group of storage pools may be defined within the policy to perform a common set of deduplication activities across all pools within the group.

21 Claims, 8 Drawing Sheets

U.S. PATENT DOCUMENTS

| | | | |
|---|---|---|---|
| 2006/0036901 A1 | 2/2006 | Yang et al. | |
| 2006/0224846 A1 | 10/2006 | Amarendran et al. | |
| 2006/0230244 A1 | 10/2006 | Amarendran et al. | |
| 2007/0208788 A1* | 9/2007 | Chakravarty et al. | 707/204 |
| 2007/0214197 A1* | 9/2007 | Bolik et al. | 707/204 |
| 2007/0226444 A1* | 9/2007 | Yagawa | 711/170 |
| 2008/0005141 A1 | 1/2008 | Zheng et al. | |
| 2008/0005201 A1 | 1/2008 | Ting et al. | |
| 2008/0282047 A1* | 11/2008 | Arakawa et al. | 711/162 |
| 2008/0294660 A1 | 11/2008 | Patterson et al. | |
| 2008/0294696 A1 | 11/2008 | Frandzel | |
| 2009/0013140 A1* | 1/2009 | Bondurant et al. | 711/162 |
| 2009/0083563 A1* | 3/2009 | Murase | 713/324 |
| 2009/0112945 A1* | 4/2009 | Camble et al. | 707/204 |
| 2009/0204636 A1* | 8/2009 | Li et al. | 707/103 Y |
| 2009/0204649 A1* | 8/2009 | Wong et al. | 707/204 |
| 2009/0204652 A1 | 8/2009 | Chikusa et al. | |
| 2009/0271402 A1* | 10/2009 | Srinivasan et al. | 707/6 |
| 2009/0327625 A1* | 12/2009 | Jaquette et al. | 711/160 |
| 2010/0042790 A1 | 2/2010 | Mondal et al. | |
| 2010/0042804 A1 | 2/2010 | Ignatius et al. | |
| 2010/0077013 A1* | 3/2010 | Clements et al. | 707/822 |

OTHER PUBLICATIONS

Andrew McCallum, "Extraction: Distilling Structured Data from Unstructured Text," ACM Queue, Nov. 2005, pp. 49-57.
G. Niklas Noren, "A Hit-Miss Model for Duplicate Detection in the WHO Drug Safety Database," Aug. 2005, 10 pages.
Periklis Andritsos, "Information—Theoretic Tools for Mining Database Structure from Large Data Sets," Jun. 2004, 12 pages.
Office Action received from USPO, U.S. Appl. No. 12/349,318.

* cited by examiner

POLICY BASED SHARING OF REDUNDANT DATA ACROSS STORAGE POOLS IN A DEDUPLICATING SYSTEM

FIELD OF THE INVENTION

The present invention generally relates to data deduplication activities in a data storage management system. The present invention more specifically relates to implementing policy-based sharing of redundant data within a storage management system that provides a repository for computer information that is backed up, archived, or migrated from client nodes in a computer network.

BACKGROUND OF THE INVENTION

The basic premise of a data deduplication system is that data stored into the system must be analyzed, broken into pieces (commonly referred to as "chunks"), duplicate chunks identified (each unique chunk is given a digital signature strong enough to declare that two chunks with the same signature are actually the same data), and duplicate chunks eliminated. Normally, as the deduplication system breaks apart larger objects into chunks, it must keep track of the individual chunks which make up the larger object, so the larger object can be retrieved when desired.

Deduplication reduces space requirements by eliminating redundant chunks of data objects and replacing them with links or pointers to the single remaining chunk. Generally speaking, there must be some type of index or database to keep track of the chunks of a larger object so that the larger object can be reassembled and retrieved after deduplication has removed the redundant chunks. Furthermore, the database used to track the chunks is generally embedded within the deduplication system. In other words, the deduplication system knows about its objects and chunks, but does not generally share this chunk information with any other system.

The deduplication system may be embodied in a storage management system that spans multiple storage volumes and storage pools. For example, data may be sent by storage management clients or data protection agents to the storage management server for storage. One characteristic of a storage management system is that data can be copied for redundancy, transferred to a new media type, or moved to reclaim unused space from deleted objects. Data redundancy and deduplication, in fact, work well together in a storage management system, because the more data that is deduplicated, the more important it is to have some backup copies of the data within the storage management system to help protect overall data integrity.

The scope of deduplication that is performed within a storage management system may involve opposing considerations. For optimal space efficiency, deduplication should be performed across as large a body of data as possible, to enable the system to identify and reduce redundancy anywhere within that body. For example, optimal space savings is achieved if data from all users with a common operating system is deduplicated and common data is shared. However, other factors may dictate that bounds be placed on the scope of deduplication. For example, it may not be desirable to deduplicate all data, as deduplication may eliminate redundancy that is needed for data protection. Similarly, for data stored on high performance media it may not be desirable to reference common data on lower-performance media, as this would degrade access.

What is needed is a method for allowing the sharing of redundant chunks across a broad scope within a storage management system, while also enabling restrictions on the degree of sharing when appropriate.

BRIEF SUMMARY OF THE INVENTION

One aspect of the present invention enables data chunks to be deduplicated across different data stores and storage pools. The scope and efficiency of deduplication may be expanded beyond a single storage pool to a number of storage pools within a storage management system. In one embodiment, deduplication across multiple storage pools is accomplished by maintaining deduplication information at the storage management system-wide level, rather than at the deduplicating pool level. Accordingly, the storage management system may deduplicate data by simply referencing common chunks that reside in another storage pool.

A further aspect of the present invention includes defining policy-based rules to restrict the scope of deduplication across the multiple storage pools within the storage management system. This may be performed by specifying a policy to control whether a storage pool may reference deduplicated data chunks stored within another pool. Additionally, this policy may be configured to control deduplication within a defined group of storage pools.

In one embodiment, an operation for enabling policy-based sharing of redundant data across deduplicating systems includes managing the storage and deduplication of a data object across a plurality of storage pools within a storage management system. The data object is divided into one or more deduplicated data chunks, with storage information for the one or more deduplicated data chunks and deduplication information for the data object both tracked in an index at the storage management system level.

The parameters of performing deduplication of the data object across more than one of the plurality of storage pools are applied according to a defined policy. Accordingly, the data object may be deduplicated across more than one of the plurality of storage pools based on the values within the defined policy. The process of deduplicating the data object across the plurality of storage pools may then include linking to deduplicated data chunks already existent within other storage pools. In this embodiment, because each of the indexes used for tracking storage information and deduplication information is accessible by each of the plurality of storage pools, various deduplicated data chunks of the data object may be stored throughout the storage management system.

In further embodiments, the defined policy applied to the deduplication process expressly defines whether data objects stored in a given storage pool may reference chunks stored in specified other storage pools within the plurality of storage pools. Additionally, if the data object is transferred from a source pool that references chunks in other storage pools to a target pool whose policy does not allow referencing of the data chunks, the system may be configured to transfer each and every of the data chunks to the target pool. Additionally, if the data object is transferred from a source storage pool to a target pool whose policy allows referencing of data chunks in certain other pools, the system may transfer only those chunks that do not already exist in the target pool and cannot be referenced in another pool.

In still a further embodiment, the policy may be configured to define settings for a group of storage pools. Accordingly, a standardized policy may be applied across all members of the group, such as enabling all storage pools within the pool group to share deduplicated data chunks and prohibiting deduplication of data chunks with storage pools outside of the pool group.

DETAILED DESCRIPTION OF THE INVENTION

One aspect of the present invention includes enabling the efficient transfer of deduplicated data between storage pools in a storage management system without the need to re-assemble and unnecessarily deduplicate data chunks. In one embodiment of the present invention, efficient transfer of data between storage pools is facilitated by storing deduplication information on a storage management system level, rather than at the deduplicating pool level. Even though some storage pools within the system may deduplicate data and other storage pools may not, the information relevant to deduplication activities is stored at a higher, storage management system level. This enables data to be segregated within distinct pools of the storage management system, while facilitating the flexibility to move individual chunks from one storage pool to another and preserve the integrity of each pool individually and the system collectively.

Another aspect of the present invention includes enabling common data chunks to be shared among different data stores and storage pools, thereby increasing the scope and efficiency of deduplication. This feature is also facilitated by maintaining deduplication information on a storage management system-wide level, rather than a deduplicating pool level. Even though some storage pools within the system may be deduplicating and some may not, the relevant deduplication information is maintained at a higher level that may be accessed by multiple storage pools. This enables the storage management system to deduplicate data by simply referencing common chunks that reside in another storage pool.

In a further embodiment, policy-based rules may be used to restrict the scope of deduplication occurring across storage pools. These rules may be implemented by specifying a policy to define which pools may reference data chunks stored within one or more other specific pools. However, the ability to reference data chunks within a storage management system is not an all-or-nothing setting, because it may be possible to reference chunks in some, but not all, of the other storage pools. Accordingly, this embodiment of the present invention allows data to be logically transferred to another pool by simply creating references to any existing data chunks in other pools, provided that the policy allows the target pool to reference chunks in these other pools.

A storage pool is broadly defined as a set of volumes that have similar characteristics, such as physical, segmentation, or redundancy characteristics. For example, a storage management system may have a plurality of storage pools that are broken up by device type, such as a primary storage pool on disk and a backup copy pool on tape. When the storage management client sends a data object (whether it is for backup, archive, or any other purpose), it is the responsibility of the storage management system to safeguard that copy of the data. To that end, one best practice is to have the storage management system make a redundant copy of the data, which may even include moving the redundant copy off-site for disaster-recovery scenarios. Similarly, storage pools may separate sets of data from each other based on physical segmentation requirements (e.g., regulatory requirements to keep sensitive data separated within different storage pools). A primary characteristic of storage pools currently existing in the art, however, is that each file within a storage pool will be stored as a complete file within the storage pool.

Deduplicating storage pools (or "deduplication systems") operate by taking large data objects and breaking them up into chunks using a fixed- or variable-sized chunking algorithm, such as Rabin Fingerprinting. The chunks are then digested to generate a unique digital signature (using SHA1, for example). Furthermore, as each object is broken up, a list of chunks is maintained so that the original object can be reconstructed.

In one embodiment of the present invention, these basic chunking and digesting activities are performed as in a typical deduplication system. Instead of tracking the deduplication information for each storage pool in which the data resides, the information is tracked in an index or table at a higher level in the database of the storage management system.

Through use of the present invention, once an object has been processed, the fundamental structure of the object is changed, not merely in the scope of the individual deduplication system, but rather in the scope of the entire storage management system. Accordingly, a further aspect of the present invention eliminates the inefficiency of re-assembling and repeating deduplication of transferred data. Because deduplication information is stored above the storage pool layer, the storage management system is able to move data between storage pools at a chunk-level without having to re-chunk or re-digest each piece of data.

Similarly, once data is stored in a deduplication pool within the storage management system, it would be inefficient to recalculate the values for the various chunks of the data object when moving it to another storage pool. Thus, once the data is analyzed according to the present invention, it is analyzed forever, and all that is required to establish access to the chunks is to find matching chunks within the index.

Figure 1:
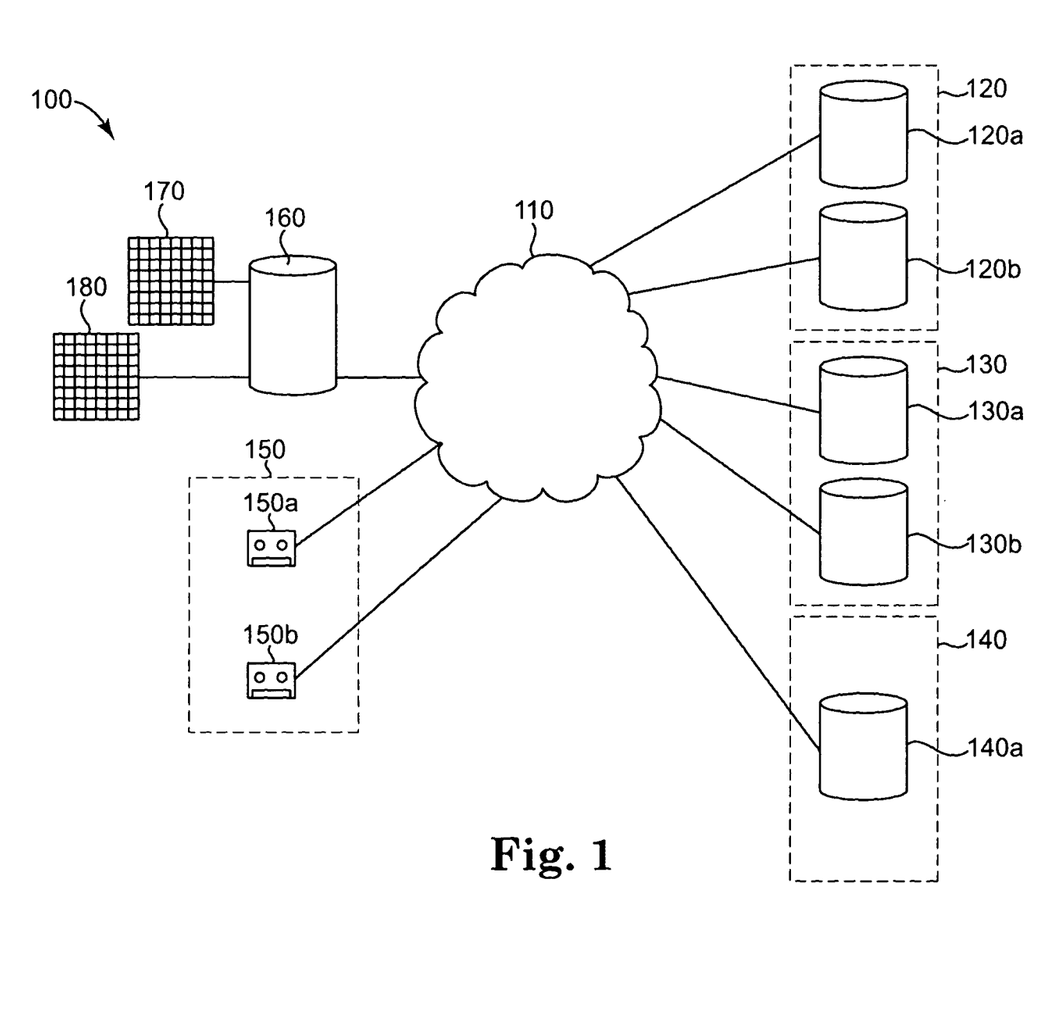
FIG. 1 illustrates an example operational environment of a storage management system according to one embodiment of the present invention.

An example operational environment for the present invention is depicted in FIG. 1, which demonstrates a storage management system 100 operating over a network 110. The storage management system 100 includes a number of storage pools 120, 130, 140 where data is stored during its normal operation within the storage management system. The storage pools include storage disks 120a, 120b, 130a, 130b, and 140a accessible over the network 110.

The storage management system 100 further includes a "copy pool" 150 to contain backups of data objects that are stored in the various storage pools. The copy pool 150, which is implemented in this embodiment in the form of tape backup systems 150a and 150b, may also be implemented by other suitable backup means.

The storage management system 100 further includes a database 160 that contains two indexes 170 and 180. Index 170 tracks the location of data objects stored throughout the storage management system 100 and thus tracks the location of specific data objects within the storage pools or copy pools. Index 180 tracks deduplication information for objects which have been deduplicated within the storage management system.

Figure 2:
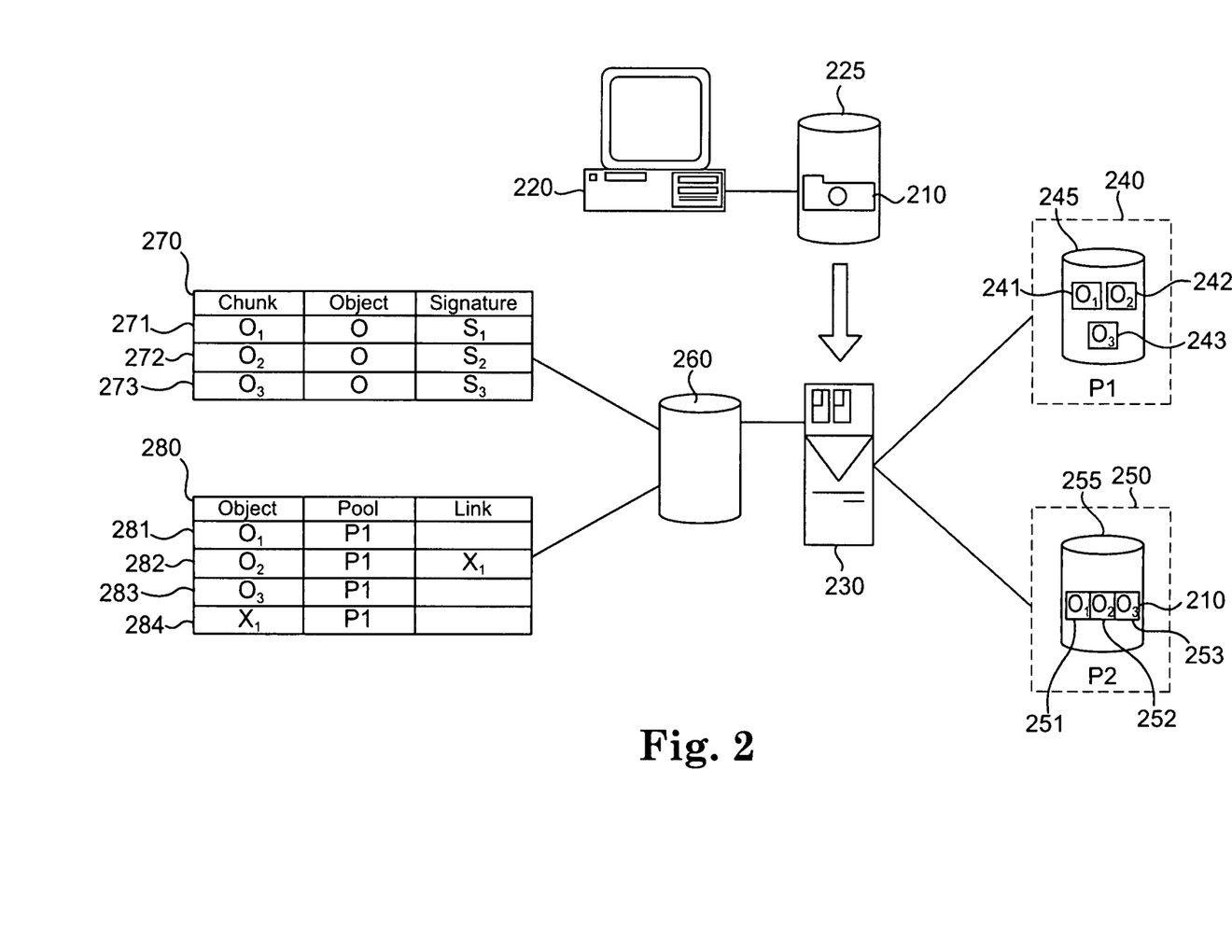
FIG. 2 illustrates an example operation of storing data on a storage management system configured to enable the transfer data between storage pools according to one embodiment of the present invention.

An example operation of storing data on a storage management system configured to enable the transfer data between storage pools according to one embodiment of the present invention is depicted in FIG. 2. As depicted, object O 210 is transferred from a volume 225 on a storage management client 220 to the storage management server 230 for storage (perhaps as a backup, archive, etc). Upon import into the storage management system, the data object 210 is intended to be stored on a volume 245 within a first storage pool P1 240 inside the storage management system. Assume that this data object O 210 is also concurrently stored on a volume 255 within a second storage pool 250 inside the storage management system, such as through the use of a simultaneous write feature that makes two or more separate copies as the data is being received by the server 230. Further assume that the first storage pool P1 240 is a deduplicating pool (i.e., performs deduplication for data objects on all volumes within its pool), and that the second storage pool P2 250 is a non-deduplicating pool.

After the data object 210 is imported into the storage management system, the data will be stored in the first storage pool P1 240 in deduplicated form and in the second storage pool P2 250 without deduplication. Although FIG. 2 suggests the deduplication process occurs during ingestion to the storage management system, the same results of this embodiment of the present invention may be achieved through use of a post-ingestion deduplication process.

As a result of deduplication on the first storage pool 240, object O becomes pieces $O_1$ 241, $O_2$ 242, and $O_3$ 243, where $O_1$ 241, $O_2$ 242, and $O_3$ 243 represent the three pieces into which object O was chunked. Accordingly, the deduplication information containing the ownership and digital signatures of the chunks are stored with an entry for each chunk in an index 270 at the storage management system level. As depicted in index 270, for each chunk $O_1$, $O_2$, and $O_3$, there are rows 271-273 to include an entry for the chunk, the object associated with the chunk, and the signature of the chunk. This deduplication information stored in index 270 can then be used to easily reassemble the object at a later time. For example, the index 270 will indicate to the storage management system that chunks $O_1$, $O_2$, and $O_3$ are necessary to reassemble object O. Additionally, this deduplication information may include the sequence number of each chunk which indicates the sequence that the chunks need to be reassembled in to successfully reassemble object O.

Even though object O has only been deduplicated within the first storage pool P1 240, the storage management system is able to easily establish that object O stored within any pool is comprised of chunks $O_1$ 241, $O_2$ 242, and $O_3$ 243. As depicted in FIG. 2, the storage management system tracks each copy of object O within the storage management system in a storage information index 280. The storage information index 280 contains an entry for each object, details of which pool the copy of the object is stored in, and linking information if the object is linked to other objects in the storage management system. Additionally, this storage information may include the number of references to the instance of the data object, and the signature of the data object.

In FIG. 2, there is a storage information index 280 further depicted containing storage information for the deduplicated data chunks. After deduplication, once object O has been broken into chunks $O_1$-$O_3$, the storage management system does not track object O as an entity in the indexes (indices) related to storage location. The storage management system does track object O at some level, because the storage management client may someday ask for object O to be retrieved. From a perspective of the object storage location, however, the storage management system tracks $O_1$-$O_3$ as individual items, in addition to reassembly information for object O.

Accordingly, as shown in the storage information index 280, there is an entry 281 for chunk $O_1$ in pool P1 240 with no link, an entry 282 for chunk $O_2$ in pool P1 240 with a link to object $X_1$, an entry 283 for chunk $O_3$ in pool P1 with no link, and an entry 284 for object $X_1$ in pool P1 with no link. In this case, object $X_1$ represents a chunk from an existing object X, previously deduplicated and stored in the storage pool.

Since pool P2 is not a deduplicating pool, there are not entries in table 280 for the objects within pool P2 250. However, as shown on volume 255 in pool P2 250, object O has been split up into chunks $O_1$-$O_3$ 251-253, although all of the chunks are stored in a contiguous fashion in the pool.

Accordingly, if deduplication is turned off in a pool, or an object is deleted from the pool, the record for the object is deleted within the object index 280, but the deduplication information for the object remains intact in the system-wide deduplication information index 270. Similarly, if deduplication is turned on in a pool again, all that needs to be done is to re-create links for the deduplicated object in the storage information index 280 from the information for the object in index 270.

As depicted in FIG. 2, to fully enable retrieval of object O from deduplicating or non-deduplicating pools, object O is mapped to objects $O_1$-$O_3$ in the system-wide database. When an attempt is issued to access object O from a storage pool, the storage information index 280 is accessed to determine if chunks $O_1$-$O_3$ are stored as objects $O_1$-$O_3$ or whether the chunks are linked to other chunks in the pool. For example, to retrieve object O from deduplicating pool P1 240, the system must retrieve objects $O_1$ 241, $X_1$ (linked by $O_2$), and $O_3$ 243. In this case, $O_2$ is not stored in the pool, so the link is followed to obtain $X_1$. In the non-deduplicating pool P2 250, however, each of the chunks $O_1$-$O_3$ 251-253 exist in the pool, and no links are involved. Because $O_1$-$O_3$ are contiguous in the non-deduplicating pool P2 250, these chunks can be retrieved in sequential order to fully retrieve object O. In contrast, for the deduplicating pool P1 240, after $O_1$ 241 is retrieved, the link is followed to retrieve $X_1$ for $O_2$ (which may even reside on a different volume), followed by returning to the first volume to retrieve $O_3$ 243. In both cases, each of the chunks $O_1$-$O_3$ is retrieved, but a deduplicating pool may involve following a link for a duplicate chunk.

As is evident, by storing deduplication information in an index or database within the storage management system, rather than at the storage pool level, the system can easily move data between pools in the storage management system. Thus, deduplication information is preserved even if the pool to/from which it is moved is not a deduplicating storage pool. One skilled in the art would recognize that there are a variety of possible configurations and database operations available to successfully track and reconfigure the relevant deduplication and storage information of the data chunks and data objects.

Figure 3:
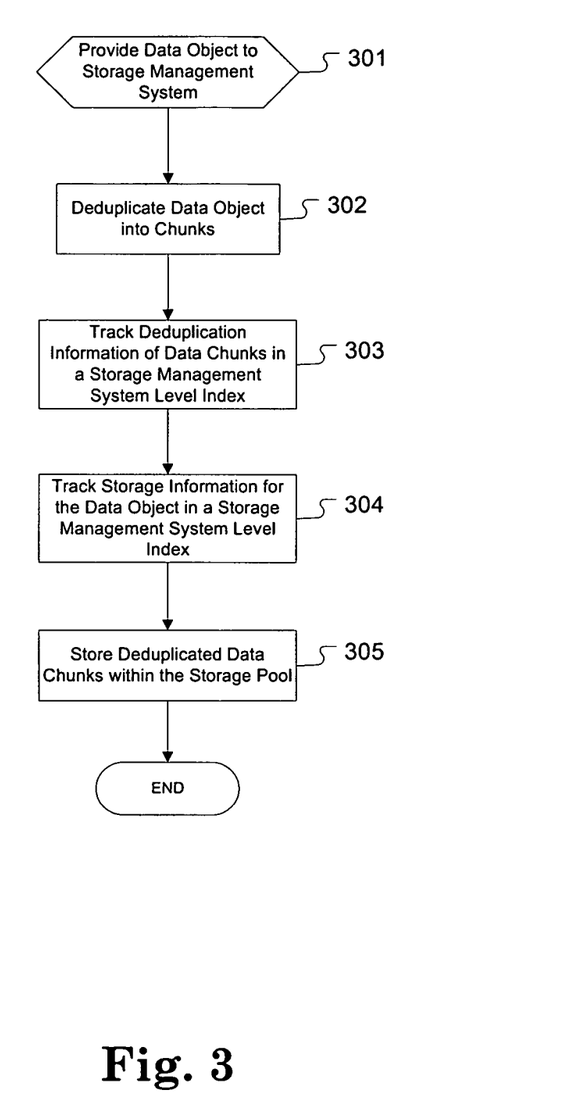
FIG. 3 illustrates a flowchart representative of an example operation of enabling the efficient transfer of deduplicated data within a storage management system according to one embodiment of the present invention.

An example operation of enabling the efficient transfer of deduplicated data within a storage management system according to one embodiment of the present invention is depicted in FIG. 3. This operation demonstrates the initial placement of deduplication and reassembly information for the data object into the deduplication information index 270, and placement of storage information for the data object's deduplicated chunks in the storage information index 280 for deduplicating pools.

First, the data object is provided to the storage management system as in step 301. Next, the data object is deduplicated into a number of chunks as in step 302. The deduplication information obtained for each of the chunks is then stored and tracked in an index located at the storage management system level as in step 303. As discussed above with reference to FIG. 2, this deduplication information may include the ownership of the chunk, the digital signature of the chunk, and the sequence of the chunk within the data object.

Additionally, the storage information for the data object is tracked in an index at the storage management system level as in 304. As also discussed above with reference to FIG. 2, this storage information may include identification of the object, identification of the object pool, number of references to the object, information to link the object to another object, and/or the signature of the object. To complete the deduplication process, the deduplicated data chunks are stored as necessary within the storage pool as in 305.

After completion of the operation depicted in FIG. 3, the data object has been analyzed and deduplicated in at least one deduplicating storage pool. It is possible that this data object is also stored in one or more non-deduplicating pools in addition to being stored within one or more deduplicating pools.

Figure 4:
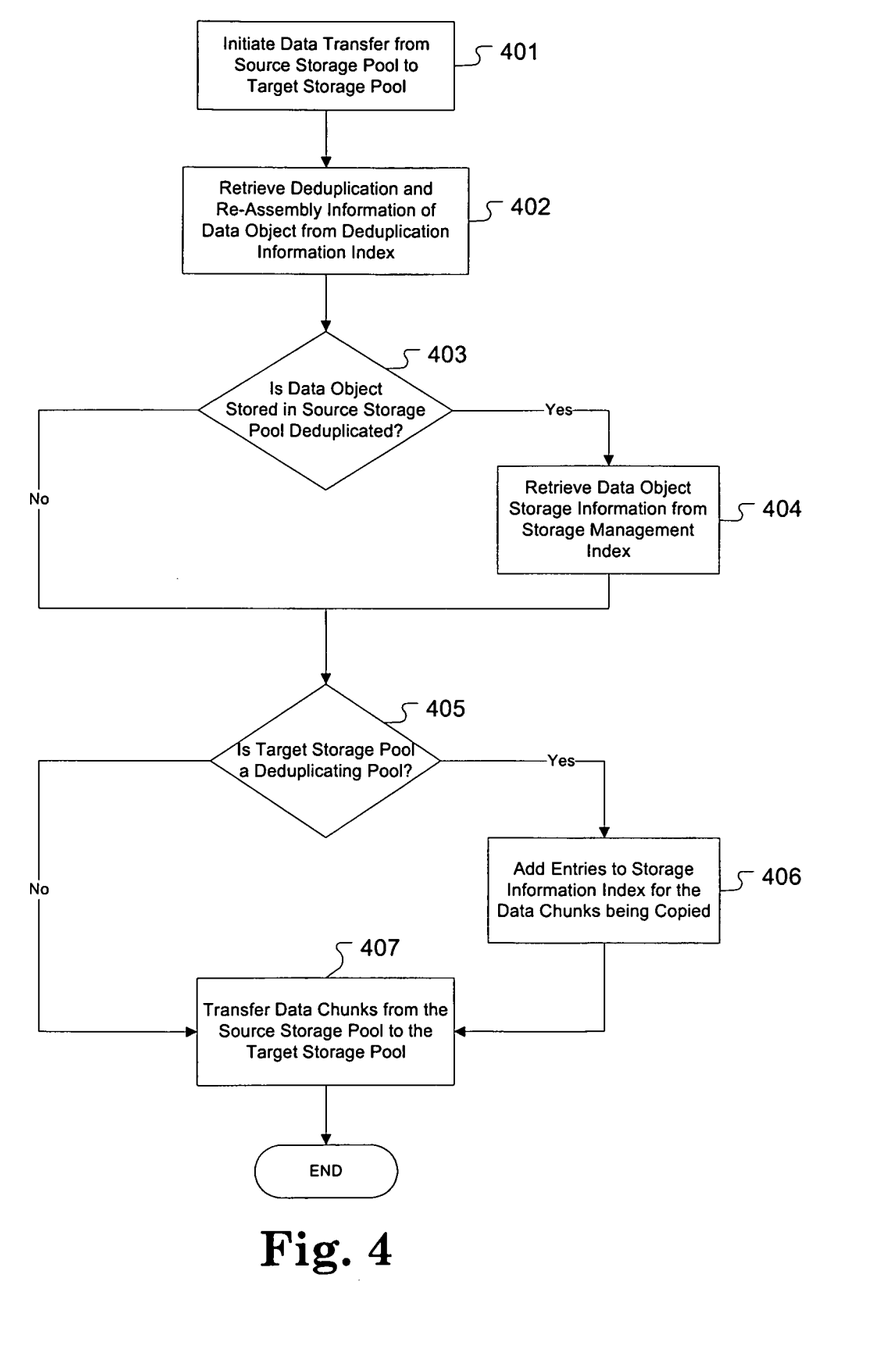
FIG. 4 illustrates a flowchart representative of an example operation of performing the efficient transfer of deduplicated data within a storage management system according to one embodiment of the present invention.

FIG. 4 depicts the operation of an efficient data transfer taking place at a later time between a source storage pool and a target storage pool within the storage management system according to a further embodiment of the present invention. This operation occurs within the storage management system after the data is deduplicated, tracked, and stored consistent with the method depicted in FIG. 3.

Although the method within FIG. 3 involves deduplicating the data object and storing it within at least one deduplicating storage pool, the efficient transfer of data between storage pools within FIG. 4 is applicable to data transfers involving any combination of deduplicated and non-deduplicated storage pools. One example scenario where a transfer from a non-deduplicated pool to a deduplicated pool would be performed is if data in the primary pool becomes damaged or inaccessible and therefore needs to be restored from a non-deduplicated copy pool. Additionally, the steps depicted in FIG. 4 can be performed multiple times, so data can be transferred among deduplicating and non-deduplicating pools in any sequence.

As shown in step 401, a data transfer is initiated from a source storage pool to a target storage pool. This data transfer may be in the form of a copy (a transfer to the target location which leaves the data object at the source location) or a move (a transfer followed by deletion of the object at the source location). Next, as in step 402, the deduplication and reassembly information of the data object is retrieved from the deduplication information index 270, even if the data transfer is occurring to or from a non-deduplicated pool.

In the case that the data object stored in the source storage pool is deduplicated per step 403, then the storage information for the deduplicated data object is retrieved from the index 280 at the storage management level as in step 404. Step 404 is not necessary for the transfer of a non-deduplicated data object, because the data chunks are stored contiguously.

It is important to note that even if the data object stored on the source storage pool is not stored in deduplicated form, the data object will still have been broken into chunks, and deduplication information for these chunks will be stored in the deduplication information index 270 at the storage management system level. All of the chunks for the data object, however, will be present and contiguous in the non-deduplicated storage pool (thereby facilitating faster retrieval of the non-deduplicated object).

Next, if the target storage pool is a deduplicating pool as in step 405 (i.e., the data transfer is taking place from a non-deduplicating pool to a deduplicating pool, or from a deduplicating pool to a deduplicating pool), the data does not need to be analyzed again, and duplicated data chunks already existing on the target storage pool do not need to be transferred from the source storage pool. The information from the deduplication information index 270 can be used to easily create the deduplicated data by establishing the necessary entries in the storage management index 280 as in step 406.

Additionally, if the target storage pool is a deduplicating pool, the storage information index 280 is examined for entries in the target storage pool to see if matching chunks already exist. If matching entries exist in the target storage pool, then the chunks are not transferred in step 407, so the entries for those chunks in the storage information index 280 will have a value in the link column. If there is no match, the chunk is copied as in step 407, and the entry for the chunk in the storage information index 280 will reflect no link. The storage management system, however, continues to track the deduplication information for the data chunks and the storage information for the data objects whether or not a data transfer ever occurs.

If the target storage pool is a non-deduplicating pool per step 405, the only operation which needs to be performed is a transfer of each of the data object's data chunks from the source storage pool (which may be either a duplicating or non-deduplicating storage pool) to the target non-deduplicating storage pool as in step 407.

As depicted in FIG. 4, deduplication may be easily performed for data that is being transferred from a non-deduplicating pool to a deduplicating pool, because the signatures of the data chunks are already tracked at the system-wide level in the deduplication information index 270. Accordingly, this embodiment allows the storage management system to bypass a deduplication analysis which would otherwise be needed to determine if duplicate chunks exist on the target volume.

The storage management system utilized in FIGS. 3 and 4 continues to track the deduplication information for the data chunks and the storage information for the data objects whether or not a data transfer of the data object ever occurs. Additionally, even if a data object is deleted from a storage pool, deduplication information is available for the object as long as it still exists in any one storage pool, and this information can be applied to all storage pools. However, once an object has been completely deleted from the storage management system, its deduplication information is removed.

Figure 5:
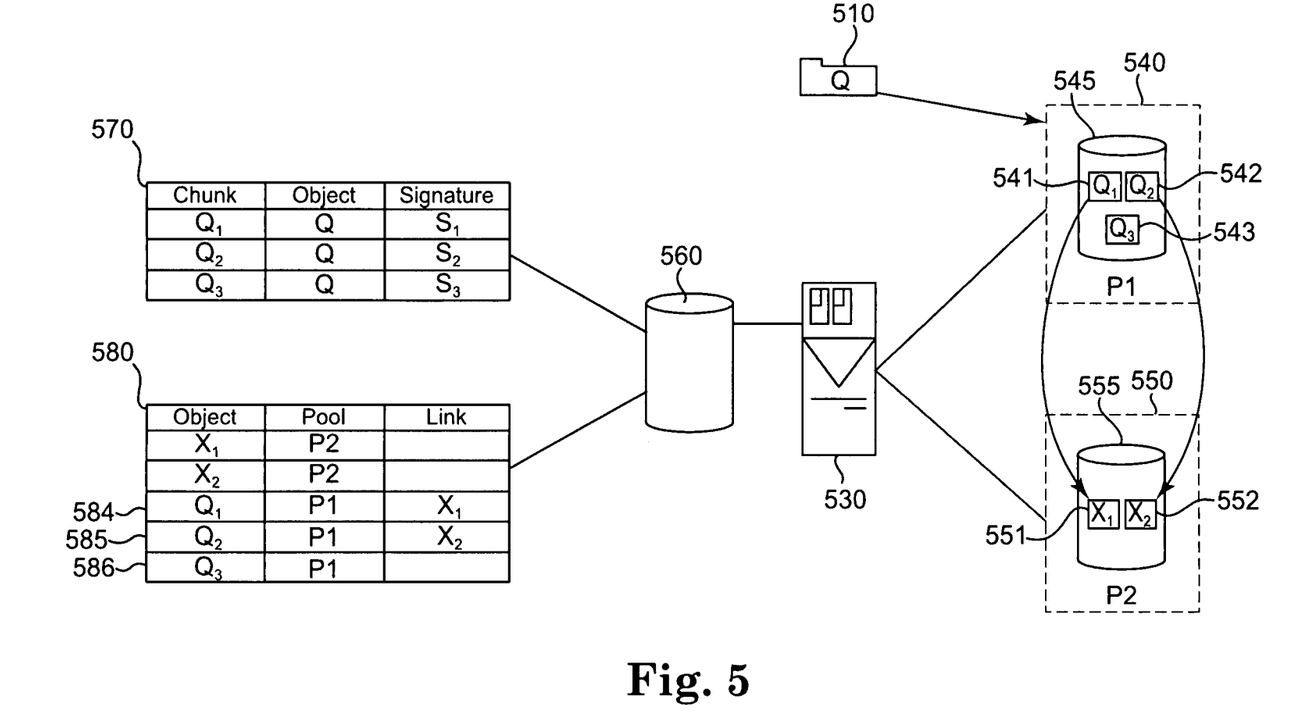
FIG. 5 illustrates an example configuration of a storage management system where data chunks are deduplicated across multiple storage pools according to one embodiment of the present invention.

In a further embodiment of the present invention, common chunks can be shared among different data stores, increasing the scope and efficiency of deduplication. FIG. 5 illustrates an example configuration within a storage management system where data chunks are deduplicated across multiple storage pools. As is depicted, deduplication of object Q 510 is achieved by maintaining deduplication information 570 and storage information 580 in an index 560 at the storage management system level 530, rather than the deduplicating pool level. Even though the various storage pools within the system may be deduplicating and some may not, the information on deduplication is kept at a higher level, accessible by multiple storage pools. This makes it possible to deduplicate data by referencing common chunks that reside in another storage pool.

As is further illustrated in FIG. 5, if object Q 510 is being backed up to storage pool P1 540, but some of the chunks of this object are already stored in storage pool P2 550, the reassembly list for the new object may reference the chunks in storage pool P2 550. Accordingly, as is illustrated in the entries 584-585 within the storage information index 580, links $Q_1$-$Q_2$ 541-542 on disk 545 in storage pool P1 540 are created to the chunks $X_1$-$X_2$ 551-552 existing on disk 555 in storage pool P2 550. Note that because a copy of chunk $Q_3$ 543 does not exist within pool P1 540 or pool P2 550, the chunk is stored in pool P1 540; an entry 586 is also created within the storage information index, but without a link to any chunk in pool P2 550.

In a further embodiment of the present invention, policy-based rules are used to restrict the scope of deduplication in some situations. This can be done by specifying the pools whose data can be referenced from another pool. For example, the storage management system may be configured to allow sharing of chunks between a backup pool and an archive pool, but not between a backup pool and an HSM pool. A deduplication policy may be defined by specifying that the backup pool can reference data in the archive pool, but not the HSM pool.

As another example, the policy could be configured to allow data in a tape pool to reference data in a disk pool, but not vice versa. This could be done by specifying that the tape pool can reference data in the disk pool, but there would not be a corresponding specification to allow the disk pool to reference data in the tape pool.

Figure 6:
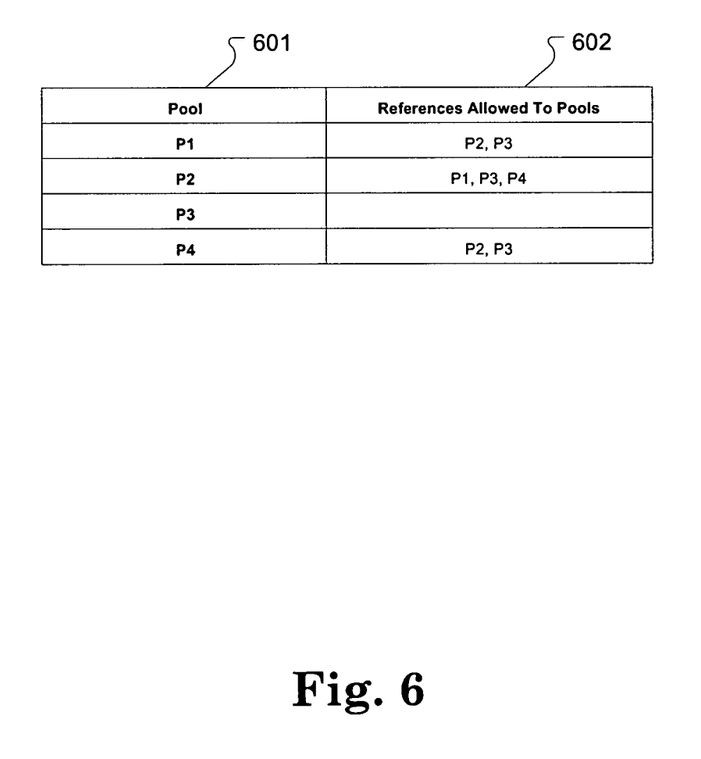
FIG. 6 illustrates an example policy for performing deduplication according to one embodiment of the present invention.

To implement this embodiment of the present invention, the policies may be expressed and utilized in various ways. FIG. 6 depicts an example policy for expressing a deduplication policy according to one embodiment of the present invention. As one example illustrated in FIG. 6, a policy applied to each pool 601 may be configured to control which of the other pools, if any, contains chunks that may be referenced 602. Thus, in the example illustrated in FIG. 6, pool P1 is configured to allow referencing of chunks in pools P2 and P3, but not any other pools that might exist such as P4. Note that within this policy example, although pool P1 is allowed to reference pool P3, pool P3 may have a policy which prevents referencing chunks within pool P1. Likewise, the policy may be configured to not allow references to chunks in any other pool, which would prevent deduplication from being performed across multiple pools.

As an additional example, the policies may support the construct of pool groups. Any pools within the same group can share common chunks and pools that are not in the same group cannot share chunks. A pool can belong to multiple pool groups. Additionally, in a further embodiment, a construct of client node groups can be supported. Any client nodes within the same node group can share common chunks irrespective of the pools in which the chunks are stored, and nodes that are not in the same group cannot share chunks.

In a further embodiment, if a data object is transferred (copied or moved) from a pool that allows referencing of chunks in other pools, to one that does not allow such referencing, the referenced chunks are also transferred. For example, suppose object O in pool P1, consisting of chunks $O_1$, $O_2$, and $O_3$ (where $O_2$ is actually stored and referenced in pool P2) is transferred to pool P3 that does not allow referencing of chunks in P2. During transfer of O from P1 to P3, chunk $O_2$ is retrieved from pool P2 and transferred to pool P3 along with chunks $O_1$ and $O_3$.

Figure 7:
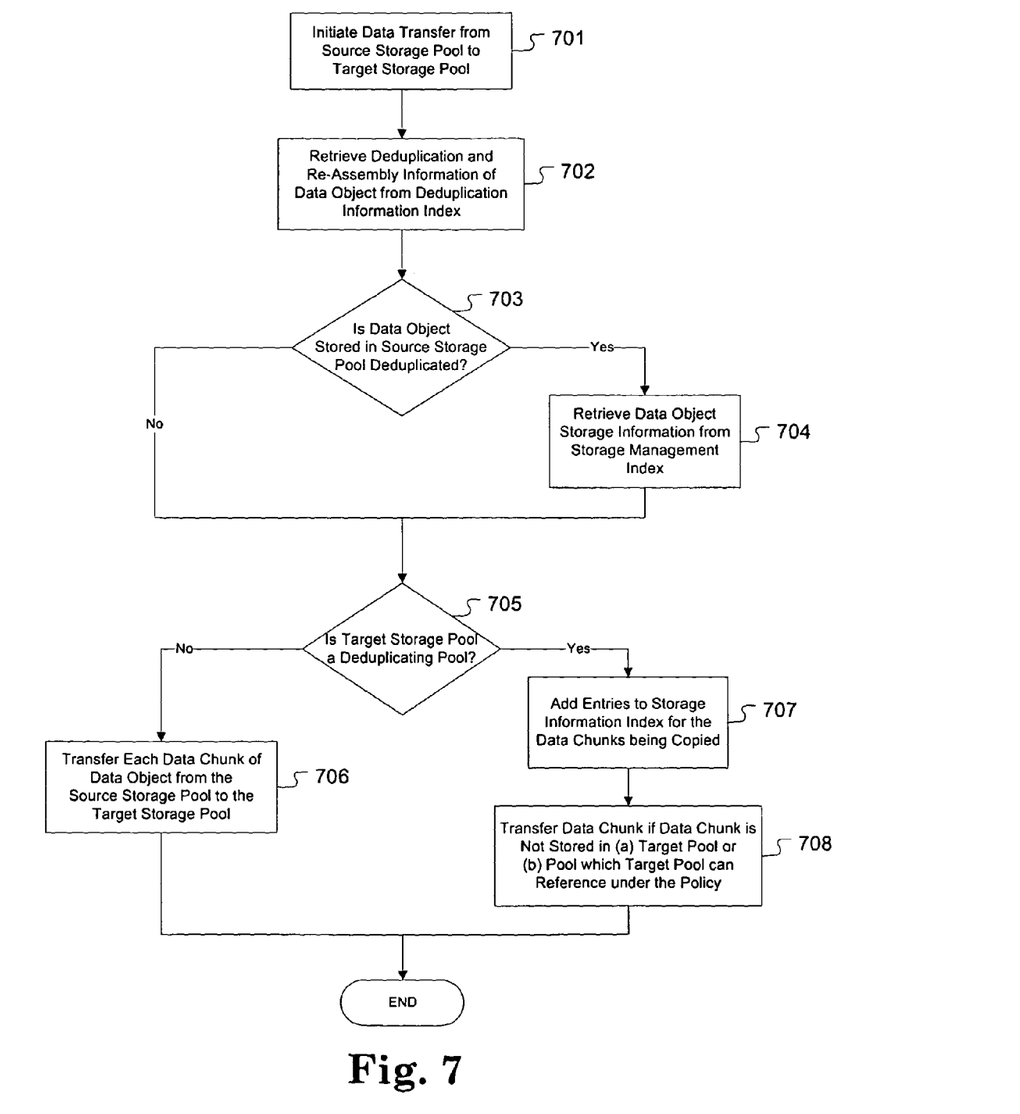
FIG. 7 illustrates a flowchart representative of an example operation of performing the transfer of data within a storage management system employing a policy-based sharing of data across storage pools according to one embodiment of the present invention.

FIG. 7 further depicts a data transfer between a source storage pool and a target storage pool within a storage management system employing a policy-based sharing of data across storage pools according to a further embodiment of the present invention. This operation is substantially similar to the process described above that is depicted within FIG. 4, but further details the steps taken when deduplication is enabled across multiple storage pools according to a defined policy.

Again, this operation is performed as a transfer of a data object is initiated from a source storage pool to a target storage pool as in step 701, and the deduplication and reassembly information of the data object is retrieved from the deduplication information index as in step 702. Additionally, if the source storage pool is deduplicated as in step 703, the storage information for the data object is retrieved from the storage management index as in step 704.

The important query is whether the target storage pool is a deduplicating pool as in step 705. If the target pool is not deduplicating, then the entire object must be transferred to the target pool as in step 706. Note, however, that if the object is deduplicated in the source pool, which itself may be referencing shared chunks in other pools according to the policy, then the chunks for the data object would need to be accessed in the source pool and other pools before being transferred to the target pool.

In the case that the target pool is deduplicating per step 705, data chunks will need to be transferred only if they do not already exist in either the target pool or in a pool in which the target pool can reference data chunks as in step 708. Thus, any chunks that are already available to the target pool under the policy do not need to be transferred in step 708, and an entry would simply need to be created in the storage information index referencing the existing chunks as in step 707. For example, for an object Q containing chunks $Q_1$-$Q_4$, suppose chunk $Q_3$ already exists in the target pool, and chunks $Q_1$ and $Q_2$ exist in another pool that can be referenced from the target pool according to the storage management system policy. In this case, the $Q_1$, $Q_2$, and $Q_3$ chunks do not need to be transferred, and entries for these chunks simply need to be established within the storage information index.

Figure 8:
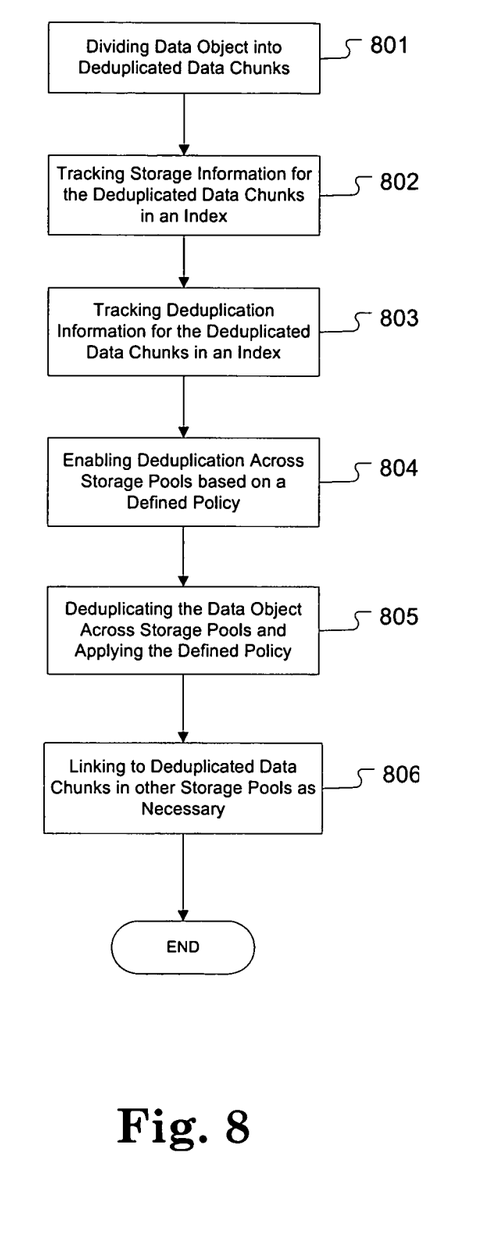
FIG. 8 illustrates a flowchart representative of an example operation for implementing a policy-based sharing of redundant data across deduplicating storage pools within a storage management system according to one embodiment of the present invention.

FIG. 8 further illustrates an operation for implementing policy-based sharing of redundant data across deduplicating storage pools within a storage management system according to one embodiment of the present invention. First, a data object is divided into deduplicated data chunks as in step 801. The storage information for the deduplicated data chunks is stored in an index at the storage management system level as in step 802, and the deduplication information for each of the chunks of the data object is stored in an index at the storage management system level as in step 803.

Next, as in step 804, deduplication for the data object is enabled across a number of storage pools by using the storage information and deduplication information that is stored at the storage management system level. Further, the deduplication of the data object across the storage pools is enabled to be performed according to a defined policy which details which pools can and cannot reference data chunks within other pools. Thus, as in step 805, the data object may be deduplicated and stored across a number of storage pools according to the rules defined within the policy. Further, the deduplication process may include linking to data chunks in other storage pools as in step 806, as necessary, consistent with the pools that are allowed to be referenced as defined within the storage policy.

As referred to within the disclosure above, a "policy" could either be applied automatically by the storage management system or could be configured by an administrator. Automatic policies may be applied in cases where the system makes policy decisions based on its understanding of data relationships. For example, there could be a primary copy of a data object and a backup copy used for protection against media failure or disaster; the system could automatically apply a policy that prevents sharing of common data chunks between these two copies, since doing so would circumvent the purpose of the backup copy. Another example of policy automatically applied by the system would be rule that ensures that a data object stored on disk does not reference chunks stored on tape, as the delays to access chunks on tape would significantly degrade overall access time for the object.

Additional policies could be configured by the administrator if that person has some insight or goal to guide how deduplicated data is shared within the system. For example, the administrator might group certain client nodes together for deduplication purposes knowing that the machines represented by these nodes store similar data that would deduplicate effectively. These additional policies could override or complement the automatically applied policies.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method in a computer system for implementing policy-based sharing of redundant data across deduplicating storage pools within a storage management system, comprising:

deduplicating a data object as data chunks across more than one of a plurality of storage pools based on a defined policy comprising a table with an entry for each storage pool, wherein an object index tracks a location of the data object, a deduplication index tracks data chunks, the plurality of storage pools are organized in a storage management system, each storage pool is designated as one of a deduplicating pool and a non-deduplicating pool, the table is stored on a storage management system level and is accessible by each of the plurality of storage pools, each entry of the table specifies allowed storage pools from which the storage pool references data chunks, tape storage pools are allowed to access disk storage pools and disk storage pools are not allowed to access tape storage pools, a first deduplicating storage pool stores a first link for a first data chunk of the data object linking to an instance of the first data chunk in an allowed deduplicating storage pool and does not store the first data chunk in response to the instance of the first data chunk existing in a third deduplicating storage pool that the allowed deduplicating storage pool is allowed to access, the first deduplicating storage pool stores the first data chunk of the data object in response to the instance of the first data chunk not existing in the allowed deduplicating storage pool, and a second non-deduplicating pool stores the data object without deduplication;

accessing the first data chunk from the allowed deduplicating storage pool using the first link if the first link is stored in the allowed deduplicating storage pool and accessing the first data chunk from the first storage pool if the first link is not stored in the allowed deduplicating storage pool; and deleting the location of the data object from the object index and tracking the data chunks of the data object in the deduplication index in response turning off deduplication in the first storage pool.

2. The method as in claim 1, wherein the defined policy allows the table to specify referencing of data chunks between a backup storage pool and an archive storage pool and does not allow the table to specify referencing of data chunks between the backup storage pool and a hierarchical storage management (HSM) storage pool.

3. The method as in claim 1, wherein the defined policy defines a pool group comprising one or more storage pools within the plurality of storage pools.

4. The method as in claim 3, wherein the defined policy is configured to enable references from a defined storage pool to data chunks stored within pools which share group membership with the defined storage pool, and to disable references from the defined storage pool to data chunks stored within pools which do not share group membership with the defined storage pool.

5. The method as in claim 1, further comprising transferring the data object from the first deduplicating storage pool to a target storage pool within the plurality of storage pools wherein, for each data chunk of the data object, the data chunk is transferred only if the data chunk is not stored within either of the target storage pool or another storage pool within the plurality of storage pools which the target storage pool can reference according to the defined policy.

6. The method as in claim 1, wherein the defined policy defines rules for client node groups, wherein each client node group comprises a plurality of storage pools and storage pools of the plurality of storage pools of client nodes within a defined node group and can share data chunks regardless of table entries for the storage pools.

7. The method as in claim 1, wherein the defined policy is derived automatically by the storage management system, and wherein the policy is explicitly overridden by defined policy settings.

8. A system, comprising:
at least one processor; and
at least one memory which stores instructions operable with the at least one processor for implementing policy-based sharing of redundant data across deduplicating storage pools within a storage management system, the instructions being executed for:
deduplicating a data object as data chunks across more than one of a plurality of storage pools based on a defined policy comprising a table with an entry for each storage pool, wherein an object index tracks a location of the data object, a deduplication index tracks data chunks, the plurality of storage pools are organized in a storage management system, each storage pool is designated as one of a deduplicating pool and a non-deduplicating pool, the table is stored on a storage management system level and is accessible by each of the plurality of storage pools, each entry of the table specifies allowed storage pools from which the storage pool references data chunks, tape storage pools are allowed to access disk storage pools and disk storage pools are not allowed to access tape storage pools, a first deduplicating storage pool stores a first link for a first data chunk of the data object linking to an instance of the first data chunk in an allowed deduplicating storage pool and does not store the first data chunk in response to the instance of the first data chunk existing in a third deduplicating storage pool that the allowed deduplicating storage pool is allowed to access, the first deduplicating storage pool stores the first data chunk of the data object in response to the instance of the first data chunk not existing in the allowed deduplicating storage pool, and a second non-deduplicating pool stores the data object without deduplication;

accessing the first data chunk from the allowed deduplicating storage pool using the first link if the first link is stored in the allowed deduplicating storage pool and accessing the first data chunk from the first storage pool if the first link is not stored in the allowed deduplicating storage pool; and deleting the location of the data object from the object index and tracking the data chunks of the data object in the deduplication index in response turning off deduplication in the first storage pool.

9. The system of claim 8, wherein the defined policy allows the table to specify referencing of data chunks between a backup storage pool and an archive storage pool and does not allow the table to specify referencing of data chunks between the backup storage pool and a hierarchical storage management (HSM) storage pool.

10. The system of claim 8, wherein the defined policy defines a pool group comprising one or more storage pools within the plurality of storage pools.

11. The system of claim 10, wherein the defined policy is configured to enable references from a defined storage pool to data chunks stored within pools which share group membership with the defined storage pool, and to disable references from the defined storage pool to data chunks stored within pools which do not share group membership with the defined storage pool.

12. The system of claim 8, further comprising transferring the data object from the first deduplicating storage pool to a target storage pool within the plurality of storage pools wherein, for each data chunk of the data object, the data chunk is transferred only if the data chunk is not stored within either of the target storage pool or another storage pool within the plurality of storage pools which the target storage pool can reference according to the defined policy.

13. The system of claim 8, wherein the defined policy defines rules for client node groups, wherein each client node group comprises a plurality of storage pools and storage pools of the plurality of storage pools of client nodes within a defined node group and can share data chunks regardless of table entries for the storage pools.

14. The system of claim 8, wherein the defined policy is derived automatically by the storage management system, and wherein the policy is explicitly overridden by defined policy settings.

15. A computer program product comprising a non-transitory computer readable medium storing a computer readable program for implementing policy-based sharing of redundant data across deduplicating storage pools within a storage management system, wherein the computer readable program when executed on a computer causes the computer to:
deduplicate a data object as data chunks across more than one of a plurality of storage pools based on a defined policy comprising a table with an entry for each storage pool, wherein an object index tracks a location of the data object, a deduplication index tracks data chunks, the plurality of storage pools are organized in a storage management system, each storage pool is designated as one of a deduplicating pool and a non-deduplicating pool, the table is stored on a storage management system level and is accessible by each of the plurality of storage pools, each entry of the table specifies allowed storage pools from which the storage pool references data chunks, tape storage pools are allowed to access disk storage pools and disk storage pools are not allowed to access tape storage pools, a first deduplicating storage pool stores a first link for a first data chunk of the data object linking to an instance of the first data chunk in an allowed deduplicating storage pool and does not store the first data chunk in response to the instance of the first data chunk existing in a third deduplicating storage pool that the allowed deduplicating storage pool is allowed to access, the first deduplicating storage pool stores the first data chunk of the data object in response to the instance of the first data chunk not existing in the allowed deduplicating storage pool, and a second non-deduplicating pool stores the data object without deduplication;

accessing the first data chunk from the allowed deduplicating storage pool using the first link if the first link is stored in the allowed deduplicating storage pool and accessing the first data chunk from the first storage pool if the first link is not stored in the allowed deduplicating storage pool; and deleting the location of the data object from the object index and tracking the data chunks of the data object in the deduplication index in response turning off deduplication in the first storage pool.

16. The computer program product of claim 15, wherein the defined policy allows the table to specify referencing of data chunks between a backup storage pool and an archive storage pool and does not allow the table to specify referencing of data chunks between the backup storage pool and a hierarchical storage management (HSM) storage pool.

17. The computer program product of claim 15, wherein the defined policy defines a pool group comprising one or more storage pools within the plurality of storage pools.

18. The computer program product of claim 17, wherein the defined policy is configured to enable references from a defined storage pool to data chunks stored within pools which share group membership with the defined storage pool, and to disable references from the defined storage pool to data chunks stored within pools which do not share group membership with the defined storage pool.

19. The computer program product of claim 15, further comprising transferring the data object from the first deduplicating storage pool to a target storage pool within the plurality of storage pools wherein, for each data chunk of the data object, the data chunk is transferred only if the data chunk is not stored within either of the target storage pool or another storage pool within the plurality of storage pools which the target storage pool can reference according to the defined policy.

20. The computer program product of claim 15, wherein the defined policy defines rules for client node groups, wherein each client node group comprises a plurality of storage pools and storage pools of the plurality of storage pools of client nodes within a defined node group and can share data chunks regardless of table entries for the storage pools.

21. The computer program product of claim 15, wherein the defined policy is derived automatically by the storage management system, and wherein the policy is explicitly overridden by defined policy settings.

* * * * *